US006659484B2

United States Patent
Knodle et al.

(10) Patent No.: US 6,659,484 B2
(45) Date of Patent: Dec. 9, 2003

(54) STOWABLE STEPS

(76) Inventors: Daniel W. Knodle, c/o OT LLC, 2212 Queen Anne Ave. North, PMB712, Seattle, WA (US) 98109; Gary M. Bang, c/o OT LLC, 2212 Queen Anne Ave. North, PMB712, Seattle, WA (US) 98109

(*) Notice: Subject to any disclaimer, the term of this patent is extended or adjusted under 35 U.S.C. 154(b) by 29 days.

(21) Appl. No.: 09/802,286

(22) Filed: Mar. 8, 2001

(65) Prior Publication Data

US 2002/0125677 A1 Sep. 12, 2002

(51) Int. Cl.[7] ................................................. B60R 3/02
(52) U.S. Cl. ..................... 280/166; 280/164.1; 248/131
(58) Field of Search ............................. 280/163, 164.1, 280/166; 182/89, 91; 248/131

(56) References Cited

U.S. PATENT DOCUMENTS

| 877,006 | A | * | 1/1908 | Scobee | 248/131 |
|---|---|---|---|---|---|
| 2,001,802 | A | * | 5/1935 | Spettel | 182/91 |
| 3,266,594 | A | * | 8/1966 | Antosh et al. | 182/91 |
| 3,580,613 | A | * | 5/1971 | Northrop | 280/166 |
| 3,827,626 | A | * | 8/1974 | Daigle | 232/17 |
| 4,312,515 | A | * | 1/1982 | Allori | 280/166 |
| 4,524,475 | A | * | 6/1985 | Valentino | 182/91 |
| 4,667,918 | A | * | 5/1987 | Page | 248/418 |
| 5,697,588 | A | * | 12/1997 | Gonzalez et al. | 248/221.11 |
| 5,738,362 | A | * | 4/1998 | Ludwick | 280/166 |
| 5,897,125 | A | * | 4/1999 | Bundy | 280/166 |
| 6,149,172 | A | * | 11/2000 | Pascoe et al. | 280/166 |

* cited by examiner

Primary Examiner—Avraham Lerner
(74) Attorney, Agent, or Firm—Jensen & Puntigam, P.S.

(57) ABSTRACT

Vehicle-mountable steps with platforms which have stowed and operational (deployed) positions. A latch mechanism positively locks the platform in the selected position. The step is designed for vehicles equipped with a ball-and-receiver type of trailer hitch and is coupled to the receiver of the hitch. The step is easily removed when the hitch is needed for towing but can otherwise be left on the vehicle as the platform of the step is located out-of-the-way beneath the vehicle when the platform is located in its stowed position.

14 Claims, 16 Drawing Sheets

STOWABLE STEPS

TECHNICAL FIELD OF THE INVENTION

The present invention related to novel, improved, vehicle-mountable steps having a platform that can be moved between deployed (operative) and stowed positions.

Currently important devices embodying the principles of the present invention have a bracket that fits in the receiver (socket) of a conventional ball-and-socket type trailer hitch. The principles of the present invention will be developed primarily with reference to that application of the invention. It is to be understood that this is being done for the sake of brevity and clarity and is not intended to limit the scope of the appended claims.

BACKGROUND OF THE INVENTION

Vehicles such as many pickup trucks, vans, RVs, and SUVs have cargo beds located at a considerable height above ground level. This makes it difficult for many persons to climb into the vehicle and also difficult to lift many loads into the vehicle bed. For example, many persons have dogs which cannot jump into a truck or SUV bed, which can be 25–30 inches or more off the ground; and it can prove difficult to lift larger dogs (and other animals) to the necessary height. Even some large dogs such as Golden Retrievers, German Shepherds, and Labrador Retrievers have some difficulty jumping into and out of these types of vehicles. Many smaller breeds can't get in or out at all. As animals age they become increasingly susceptible to arthritis in their hips and elbows. This aging process makes getting in and out of vehicles even more difficult.

Also, many activities involve the putting on and taking off of boots, waders or other articles of clothing. It is oftentimes difficult to put on or remove these items while sitting in a seat or on the back bumper of a vehicle. Consequently, there is a need for a device which will also provide a seat for persons engaged in the foregoing and other tasks.

Steps or platforms (and other devices) intended to solve this problem have been proposed.

A vehicle step which has the advantage that it can be rotated between operative and stowed positions so that it can be left on the vehicle while the vehicle is moving is disclosed in U.S. Pat. No. 5,738,362 issued Apr. 14, 1998. This step, however, has the drawback that the step itself, and associated structure, must be lifted and rotated to move it between operative and stowed positions. This can be cumbersome if the step is large or heavy. Furthermore, only a keeper held in place by gravity retains the step in the position to which it is rotated. In rough terrain, the keeper may bounce upwardly and allow the step to rotate out of the intended position, damaging the device and causing other problems.

Other products which have been tried but failed to meet the need addressed by the present invention include, but are not necessarily limited to, the following:

Pet Step Ramp—This product is a plastic molded ramp that one can set on the bumper of a the vehicle to allow a dog to walk up or down into and out of the back of the vehicle. There are several problems with this product. One, there would have to be considerable room behind the vehicle to allow the product to be used. This space could be difficult to find in many urban parking situations. A second problem is where to stow the ramp when it is not being used.

Hitch Extender Step—This product does not extend as far back as the Pet Step Ramp but has the added problem of protruding beyond the bumper if left in place while driving. If it is removed and replaced between uses, the issue of storage becomes significant. Another problem is that the step is higher than may be useful since it is on the same level as the receiver of the hitch to which the device is mounted.

Receiver Hitch Stairs—This product has more problems in addition to the ones which make the Hitch Extender Step unsatisfactory. Perhaps the most serious is that the top step interferes with the back hatch of most vehicles, requiring it to be removed between uses.

Hitch Step—This product does not have the storage problems of the products above, but it is too small to effectively be used for the desired uses, such as sitting on to put on or take off boots, or to be used as a step by most dogs, or to be used to place objects on.

SUMMARY OF THE INVENTION

There has now been invented and disclosed herein a new and novel step which, like the step disclosed in the '362 patent, is designed to be mounted to the vehicle associated receiver of a trailer hitch. And, like its previously patented counterpart, the hitch disclosed herein can be swung between functioning and stowed positions. The current step, however, has the advantage that it can be moved between these two positions without lifting the step and the components utilized to mount the step to a trailer hitch component.

The steps of the present invention have a platform to which a hollow, vertically extending column is fixed such that the platform and column rotate as a unit. A complementary sleeve surrounds the vertical column, and a beam dimensioned to fit into a trailer hitch receiver is attached at one end to the sleeve such that the sleeve is fixed against rotation relative to the sleeve. Also present in the step is a mechanism which can be unlocked by pressing down on an actuator component of the mechanism. This allows a platform component of the step to be rotated from a stowed position to its operational position and vice versa. When the platform reaches the position to which it is moved, the locking components of the latching mechanism automatically re-engage, retaining the platform in the stowed or deployed position to which it is moved.

With the step deployed to its operational configuration, the platform of the step is available for use in helping persons and animals into and out of the bed of a vehicle equipped with the step. Deployed, the platform can also be used as a seat and as a support for objects including those of a significant size and/or weight.

Ease of operation and simplicity are other important features of the present invention.

Also:

The platform of the step can be stowed out of the way until needed.

The platform is securely locked in place when stowed or deployed.

The step is sturdy enough for very large animals, persons, and other appreciable loads.

The step can be easily removed for replacement with the male (ball) component of a trailer hitch for towing.

Other objects, features, and advantages of the invention will be apparent to the reader from the foregoing and the appended claims and as the ensuing detailed description and discussion proceeds in conjunction with the accompanying drawings.

BRIEF DESCRIPTION OF THE DRAWINGS

FIG. 2 is a view similar to FIG. 1 but with the platform of the step deployed to a position in which it is available for use as a step, seat, support, and the like;

DETAILED DESCRIPTION OF THE INVENTION

Figure 1:
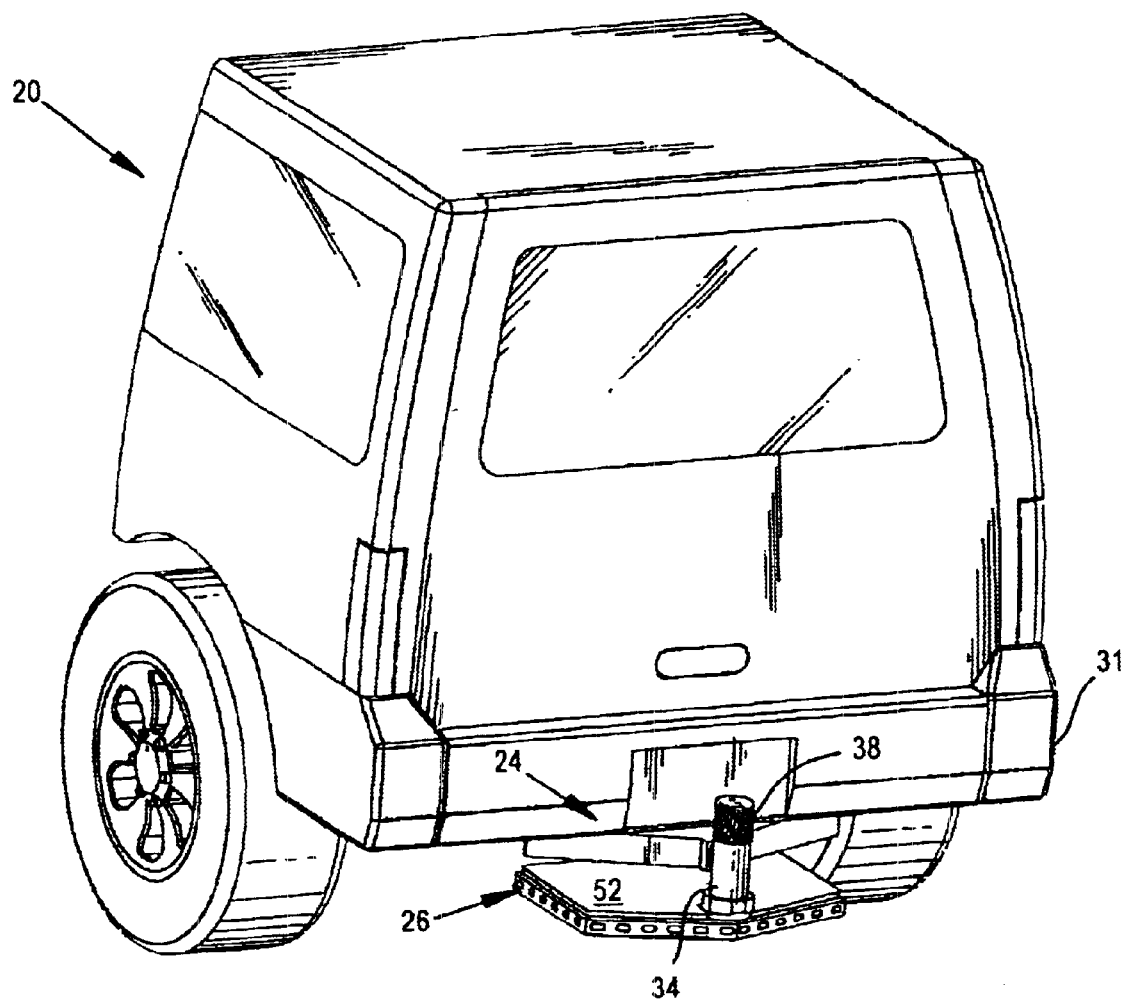
FIG. 1 is a pictorial view of: (a) a vehicle equipped with a trailer hitch, and (b) a step which embodies the principles of the present invention and is mounted to the trailer hitch of the vehicle; in this figure the step is shown in a stowed configuration in which a platform of the step is locked in an out-of-the-way position beneath the rear end of the vehicle.
Figure 2:
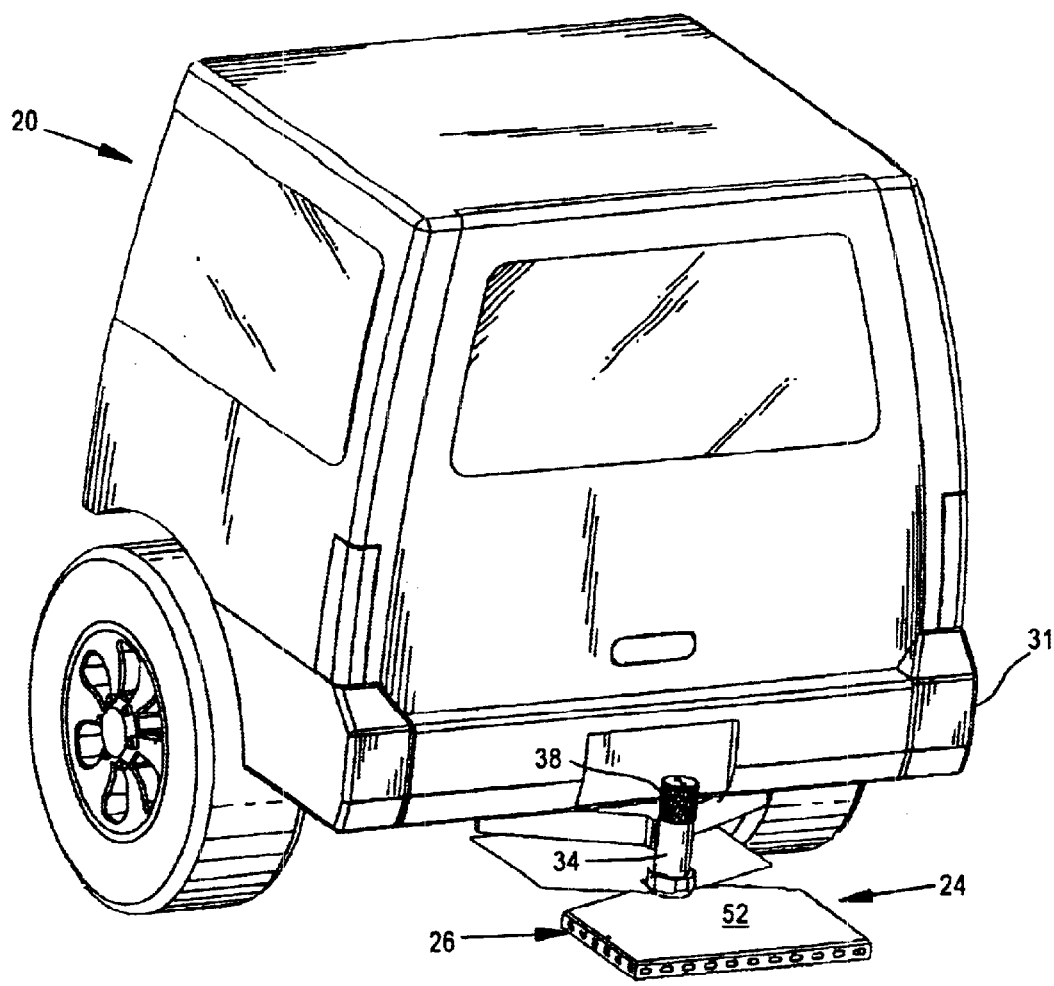
Figure 3:
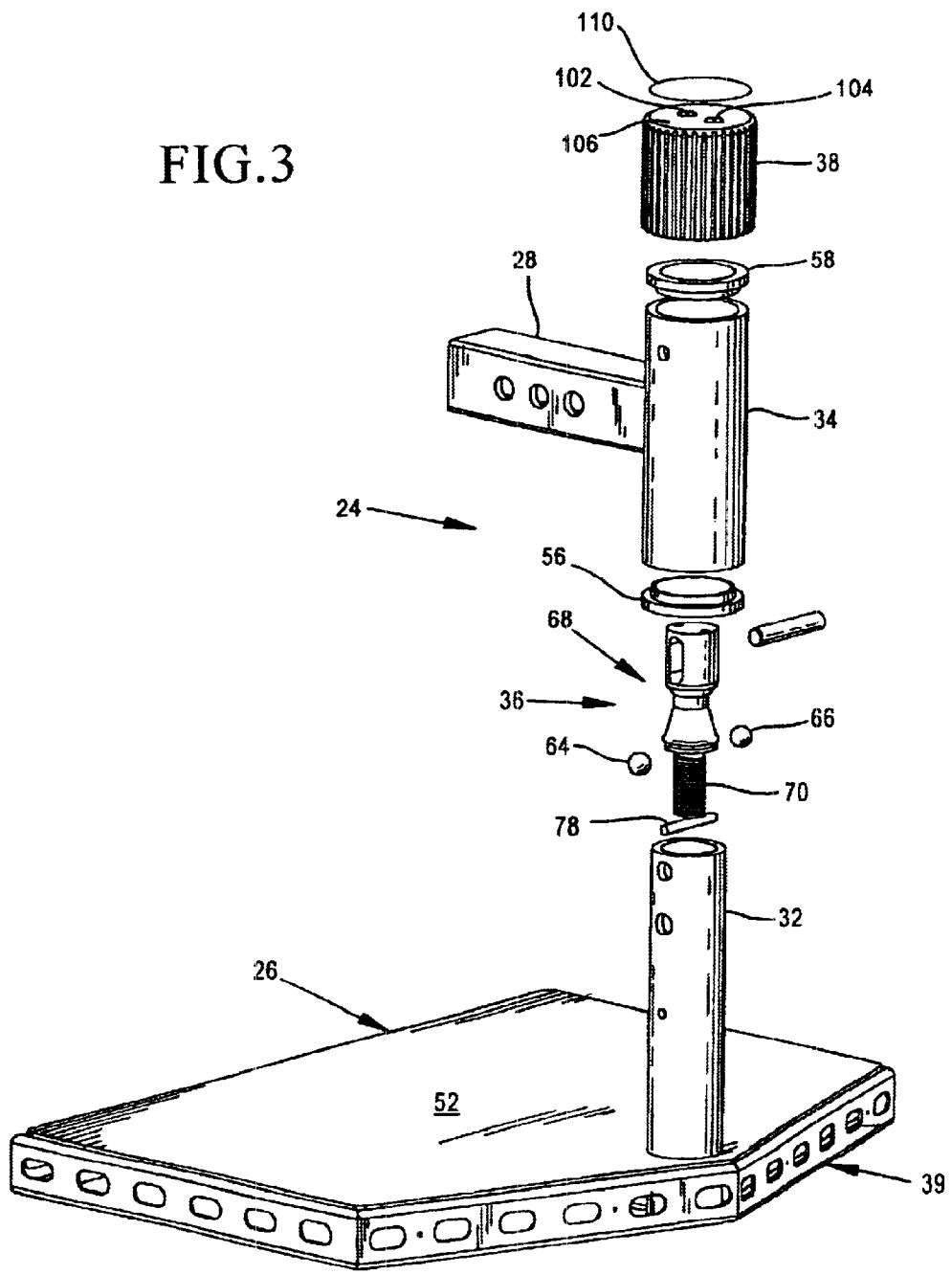
FIG. 3 is an exploded view of the step shown in FIGS. 1 and 2; this view shows, among others, the components of a latching (or locking) mechanism which keeps the platform of the step in the position—stowed or deployed—to which a person moves the platform.
Figure 4:
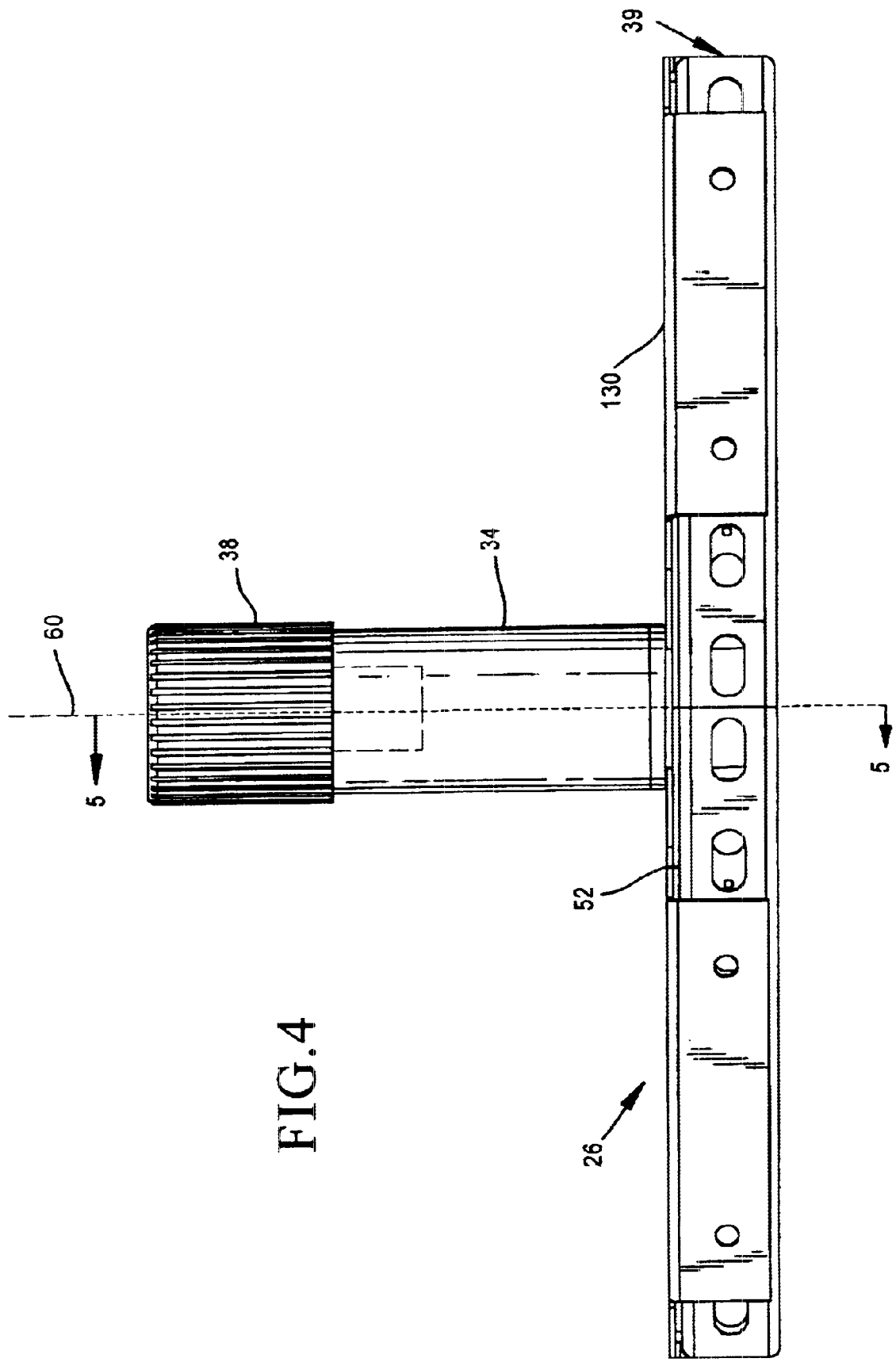
FIG. 4 is a rear view of the step with the platform of the step in its stowed position; this view shows an actuator depressed to disengage the locking mechanism so that the platform can be displaced to its deployed position; depressing the same actuator when the platform is deployed similarly disengages the locking mechanism and allows the platform to be displaced to its stowed position.
Figure 5:
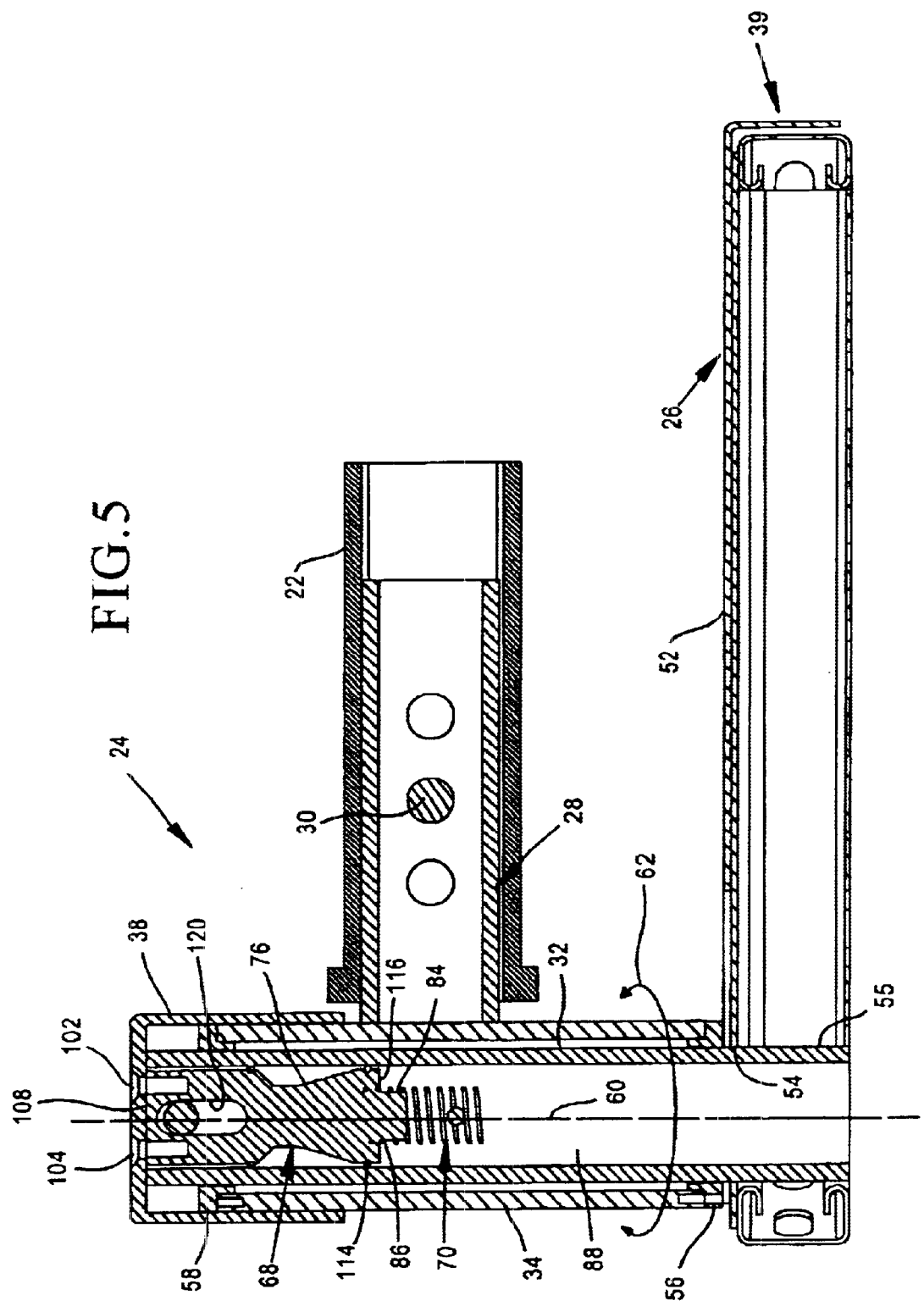
FIG. 5 is a section through the step taken along line 5—5 of FIG. 4.
Figure 6:
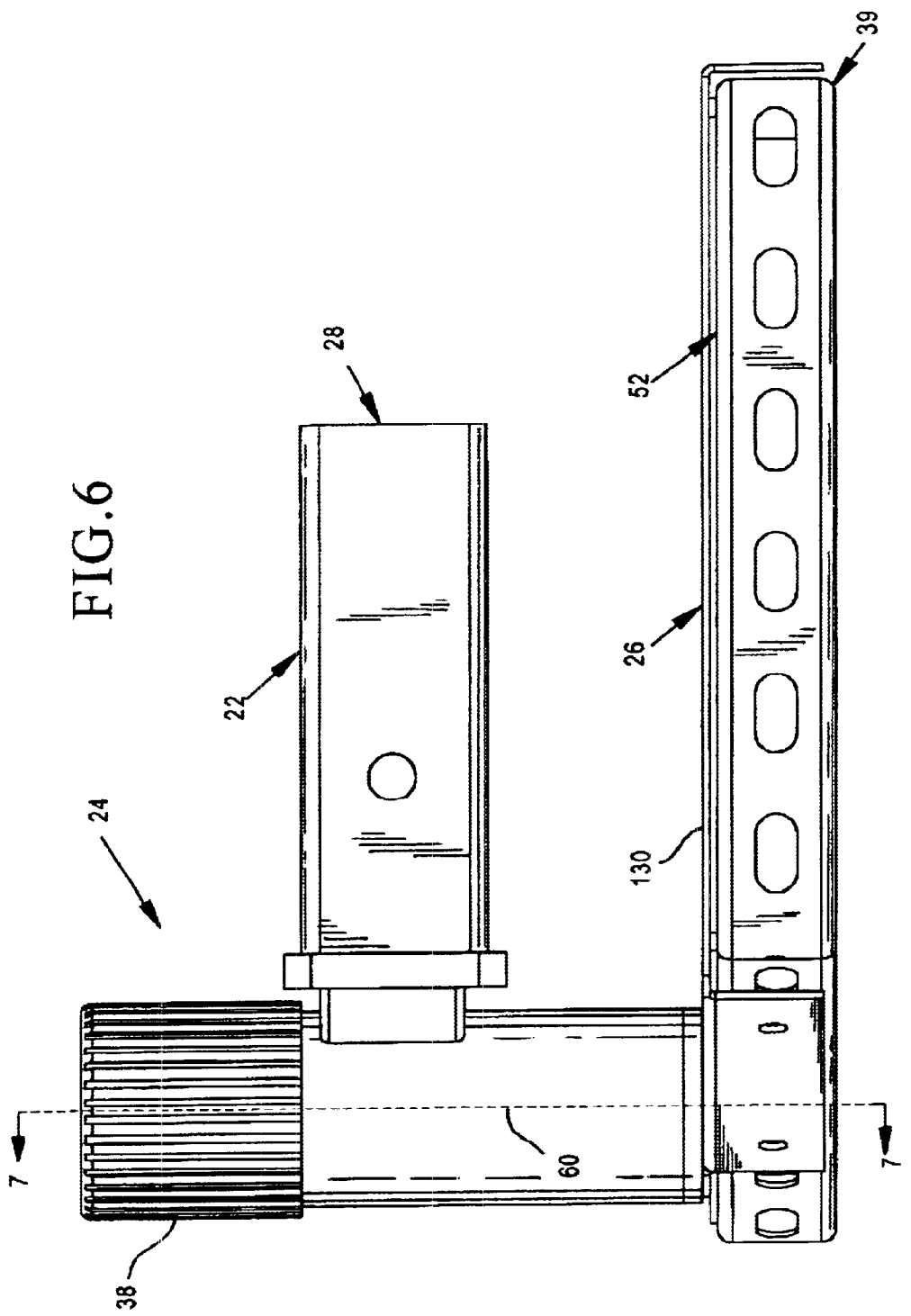
FIG. 6 is a view similar to FIG. 4 but looking at the side of the step in its stowed configuration with the actuator depressed to unlatch the locking mechanism.
Figure 7:
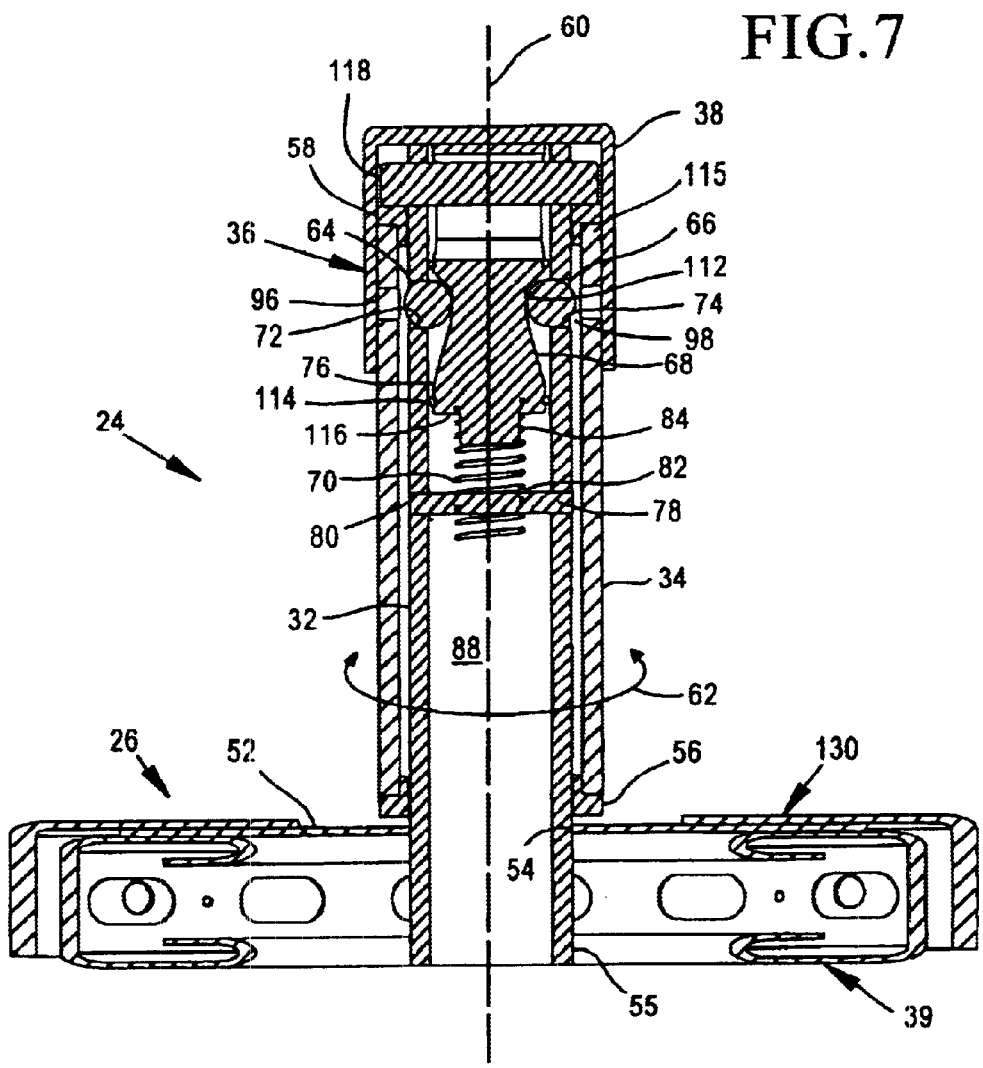
FIG. 7 is a section through the step, taken along line 7—7 of FIG. 6.
Figure 8:
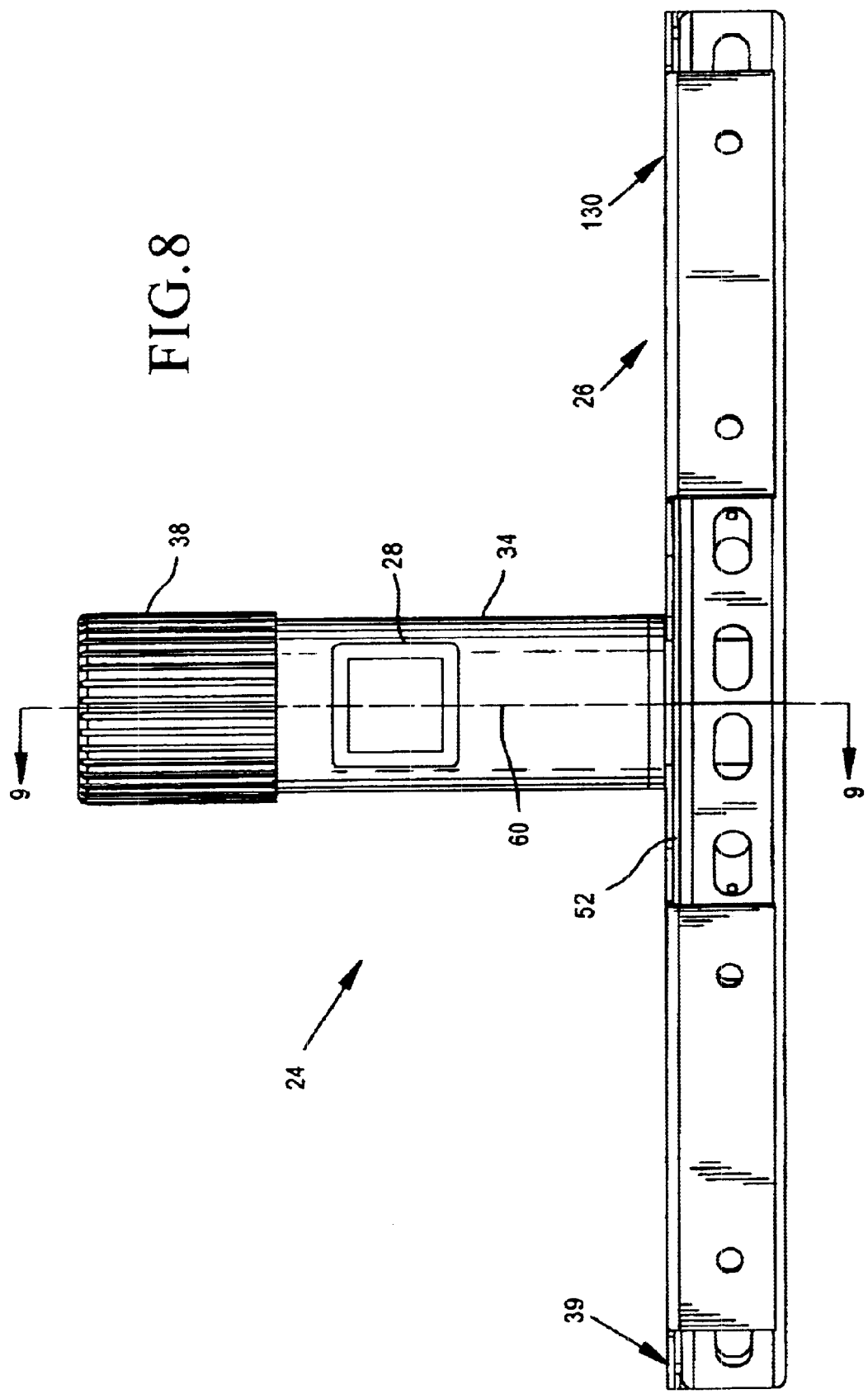
FIG. 8 is a front view of the step in its deployed configuration; in this view the actuator is in a position which allows complementary components of the locking mechanism to engage and lock the platform of the step in its deployed position.

Referring now to the drawings, FIGS. 1 and 2 depict a SUV (Sport Utility Vehicle) 20 equipped with a conventional trailer hitch which includes a socket or receiver 22 (see FIG. 5). A step 24 having a stowable and deployable platform 26 and embodying the principles of the present invention is mounted to vehicle 20 by a beam component 28 of the step. Component 28 is installed in trailer hitch receiver 22 and retained in place by a conventional trailer hitch pin 30. In the stowed configuration of step 24, the platform 26 of the step is positioned out-of-the-way under the rear bumper 31 of vehicle 20 (see FIG. 1). In the deployed, functional configuration of the step, platform 26 extends rearwardly beyond bumper 31 and is available in assisting persons, animals, etc., to climb in and out of SUV 20 and to function as a seat and a support for objects.

Referring to FIGS. 3–11, the stowable and deployable platform 26, discussed above, and the mounting beam 28 by which the step is mounted to vehicle 20 are major components of step 24. Other major components of the step, best shown in FIGS. 3, 5, 7, 9, and 11, include: a hollow, inner cylinder 32; a complementary, also hollow, outer cylinder (or sleeve) 34; a latch mechanism 36 for positively holding the platform 26 of step 24 in its stowed position (FIG. 1) and in its deployed position (FIG. 2); and an actuator 38 which, when depressed, allows platform 26 to be displaced from the FIG. 1 stowed position to the FIG. 2 deployed position and vice versa.

Figure 12:
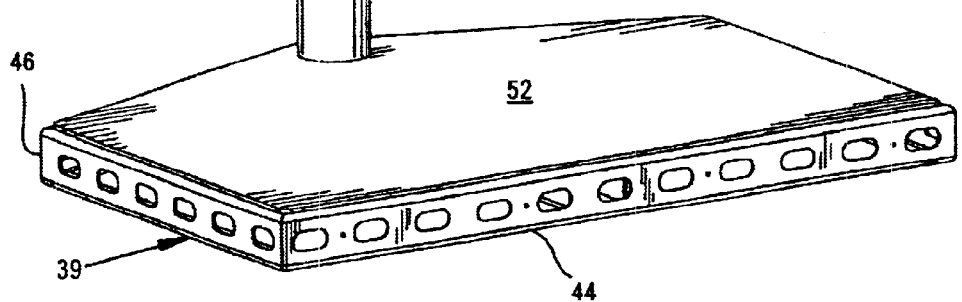
FIGS. 12 and 13 are perspective views of an assembly which is a component of the FIGS. 1 and 2 step; the assembly includes the platform of the step, a platform-supporting framework of structural members; and a vertically-extending, tubular support housing (or cylinder) for other components of the step.
Figure 13:
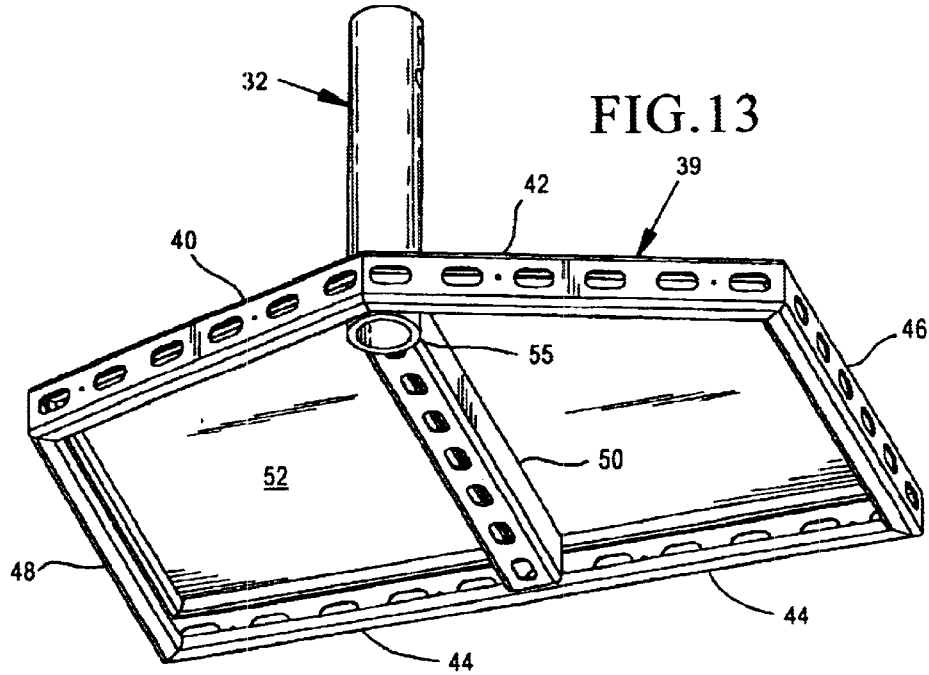
Figure 14:
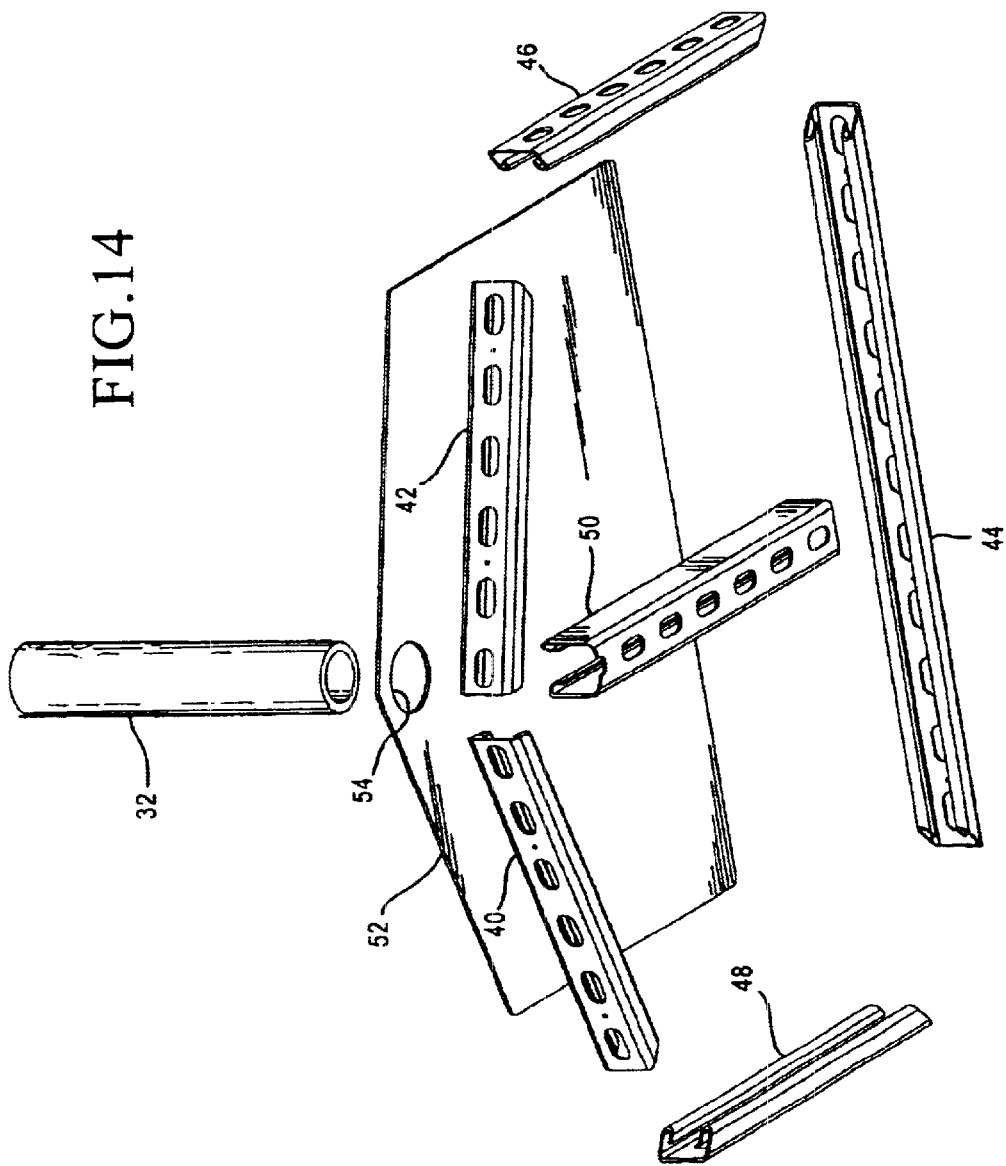
FIG. 14 is an exploded view of the FIGS. 12 and 13 assembly.

As shown in FIGS. 12–14, platform 26 has a support assembly 39 made up of front, rear, and side, channel-shaped girders 40, 42, 44, 46, and 48 and a brace 50, also of a channel-shaped configuration and extending from front girders 40 and 42 to rear girder 44. Supported by, and fixed to the assembly 39 of girders 40 . . . 48 and brace 50 is a plate or deck 52.

The inner column 32 of step 24 extends downwardly through an aperture 54 in deck 52 (FIG. 14) to a location between: (a) front girders 40 and 42, and (b) brace 50 (FIG. 13). The lower end 55 of column 32 is fixed, as by welding, to the structural components 40, 42, and 50.

As suggested above, and is best shown in FIGS. 5, 7, 9 and 11, step 24 also has an outer column 34 which surrounds the just-discussed inner column 32. Outer column 34 is supported from inner column 32 by and between lower and upper, flanged fixtures 56 and 58 fixed in any convenient manner to the inner column. These fixtures provide for relative rotational movement between the inner and outer columns about axis 60 (see FIGS. 4–11).

As discussed above, a beam 28, which can be slid into trailer hitch receiver 30, couples step 24 to vehicle 20. More particularly, beam 28 is fixed to, and extends normally from, vertically oriented, outer sleeve 34. Thus, with the step installed, outer column 34 of the step is held against rotation, while lower and upper mounting flanges 56 and 58 keep inner column 32 and platform 26 from moving up and down with respect to outer column 34 and, consequentially, to vehicle 20. At the same time, inner column 32 and platform 26 are free to rotate as a unit between the FIG. 1 stowed position of the platform and the FIG. 2 deployed position as shown by the double-headed arrow 62 in FIG. 5.

That platform 26 remains in the same plane as it is moved between its stowed and deployed positions is a significant feature of the present invention. It distinguishes steps as disclosed herein from those disclosed in the '362 patent. As discussed above, the patented step has the significant disadvantage that it must be lifted to displace the step to its stowed and deployed positions.

As discussed above, step 24 has a mechanism 36 for locking the platform 26 of the step in the FIG. 1 stowed position and in the FIG. 2 deployed position. This mechanism (see FIGS. 3, 5, 7, 9, and 11) includes locking elements 64 and 66, a cam component 68, and a compression spring 70. Blocking elements 64 and 66 are spheres or balls. These balls are disposed in complementary apertures 72 and 74 spaced 180° apart in the inner column 32 of step 22. The locking elements are kept in those apertures by a tapered, element-engaging surface 76 of cam 68.

Figure 9:
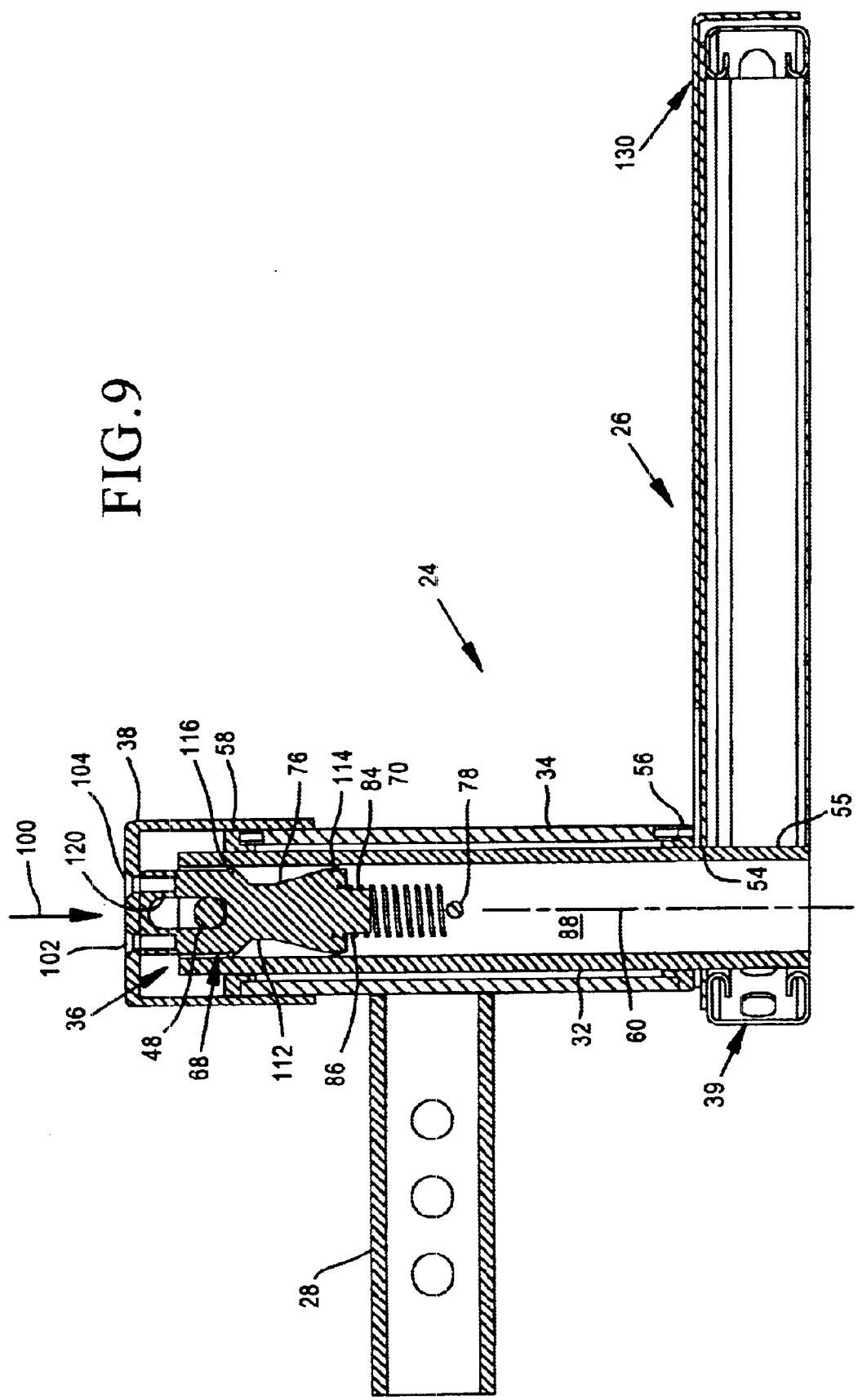
FIG. 9 is a section through the step taken along line 9—9 of FIG. 8.
Figure 10:
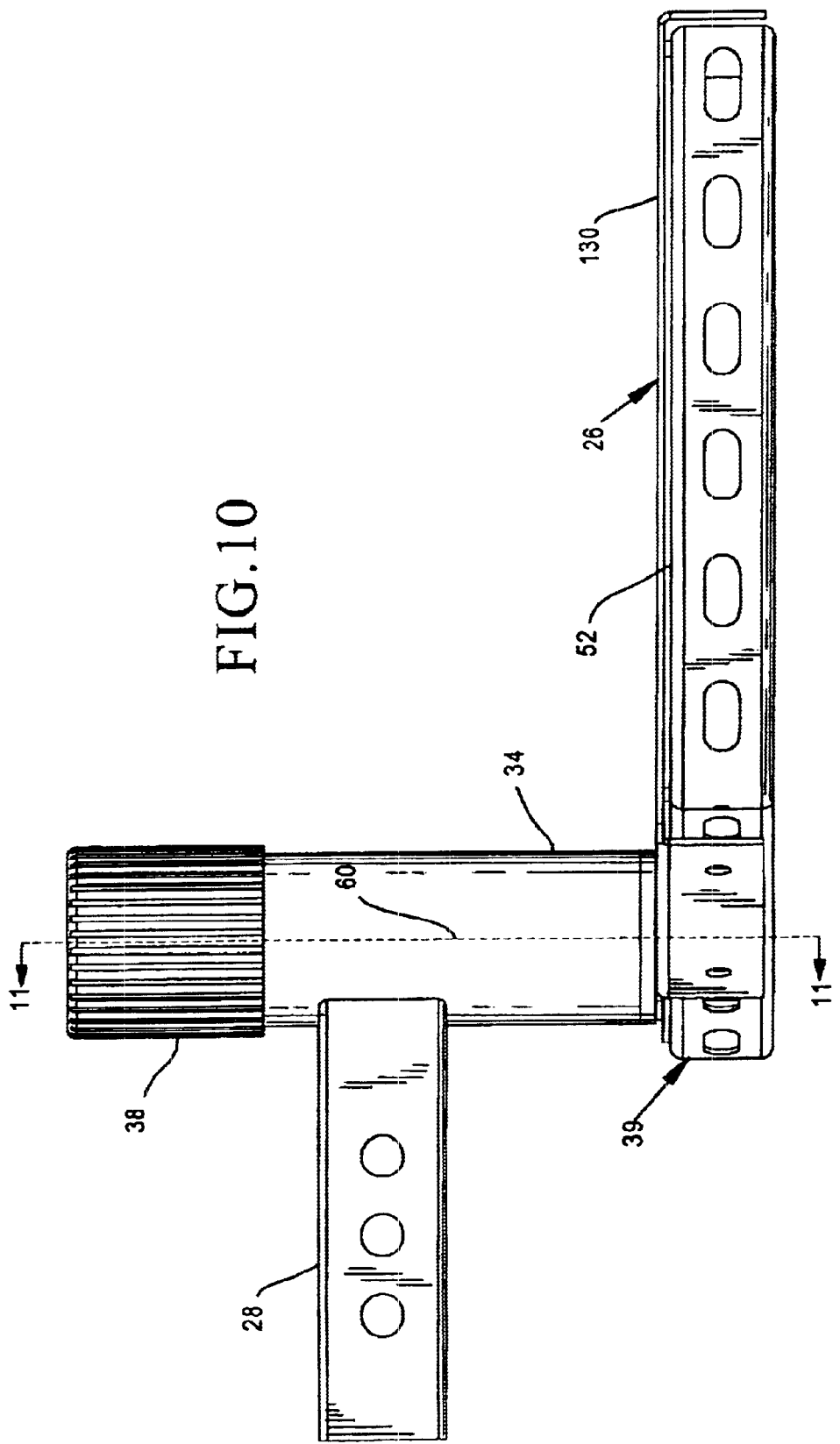
FIG. 10 is a view like FIG. 8 but looking at a side of the step.
Figure 11:
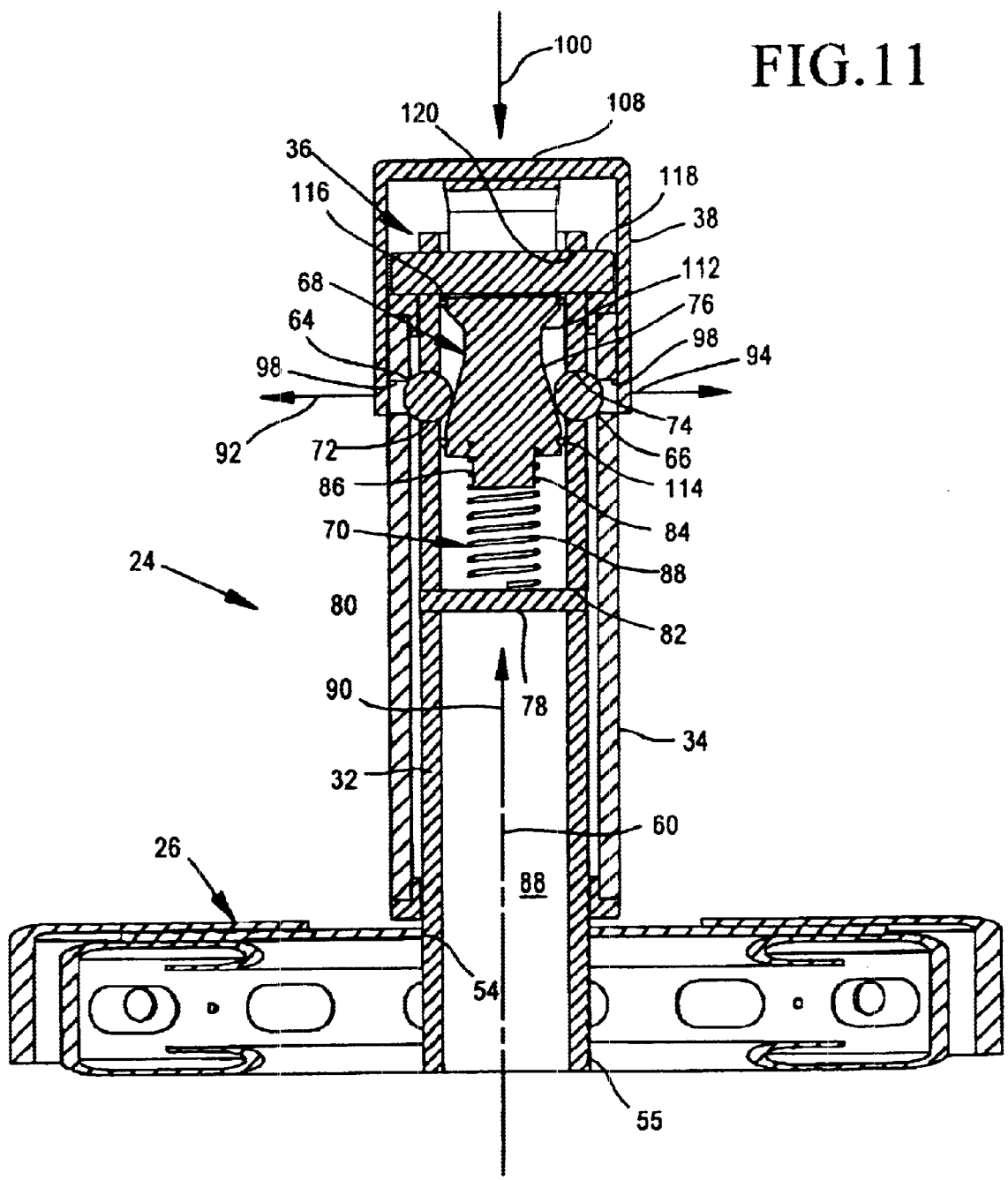
FIG. 11 is a section through the step taken along line 11—11 of FIG. 10.

Cam 68 is biased to the upper position of that component shown in FIGS. 9 and 11 by compression spring 70. The lower end of that spring rests on a support pin 78 spanning inner column 32 and extending into apertures 80 and 82 on opposite sides of the inner column. An integral, dependent boss 84 of cam 68 surrounds the upper end 86 of compression spring 70 and keeps the spring in place in the hollow interior 88 of inner column 32.

With platform 26 in its stowed or deployed positions, compression spring 70 is expanded as suggested by arrow 90 (see FIGS. 9 and 11) and biases cam 68 is to the "upper" position of that component shown in FIGS. 9 and 11. With cam 68 in this position, locking elements 64 and 66 are displaced outwardly by cam surface 76 (arrows 92 and 94 of FIG. 11) into equiangularly spaced apart apertures 96 and 98 formed in outer step column 34. With the cam in the FIG. 11 position, locking elements 64 and 66 are consequently engaged both in inner column apertures 64 and 66 and in outer column apertures 96 and 98. This locks outer column 34 of step 22 to inner column 32, keeping these columns from rotating relative to each other and consequently keeping platform 26 in the position—stowed or deployed—to which the platform has been rotably displaced.

When one wishes to move the platform 26 of step 24 from its stowed position to its deployed position or vice versa, actuator 38 of the step is displaced downwardly as suggested by arrow 100 in FIGS. 9 and 11. Actuator 38 surrounds, and is slidable up and down on, the outer column 34 of step 24. It is kept in place on the column as by screws 102 and 104 (FIG. 3) which fix a horizontal, integral element 106 of the cover to the upper end 108 of cam 68. These fasteners are typically concealed by a snap-in cover plate such as the one identified by reference character 110 in FIG. 3 but otherwise omitted in the drawings in the interest of clarity. With actuator 38 depressed (see especially FIG. 7), a nipped in portion 112 of cam surface 76 is located opposite the apertures 96 and 98 in the outer column 34 of step 24. This allows locking elements 64 and 66 to move out of the outer column apertures 96 and 98, freeing inner column 32 and platform 26 for rotation between the stowed and deployed positions of the platform as suggested by above-described, double headed arrow 62.

Once movement in an arrow 62 direction has been initiated, actuator 68 can be released. When this occurs, spring 70, compressed by the downward, arrow 100 displacement of actuator 38 and cam 68 expands, biasing the cam upwardly so that locking elements 64 and 66 will pop into outer column apertures 96 and 98 when the new position is reached. This relocks outer column 34 to inner column 32 and keeps platform 26 in the new position with the locking elements 64 and 66 being so retained by virtue of cam 68 being returned to its upper, column-locking position shown in FIGS. 9 and 11 by the biasing force exerted by the now free to expand compression spring 70.

As cam 36 moves up and down in inner column 32, it is guided by O-rings 114 and 115 at the lower and upper ends 116 and 108 of the cam. The travel of cam 68 is limited by a pin 118 which spans and is mounted in the upper end 108 of column 32 and extends through a vertically elongated slot in and near the upper end 108 of the cam. Also, when actuator 38 is depressed to shift platform 26 from one to the other of that components stowed and deployed positions, pin 118, which rests on flanged fixture 58, keeps outer column 34 from sliding up on inner column 32. Platform 52, which is spaced only slightly from platform deck 52, keeps the outer column 34 from sliding down on inner column 32.

Figure 15:
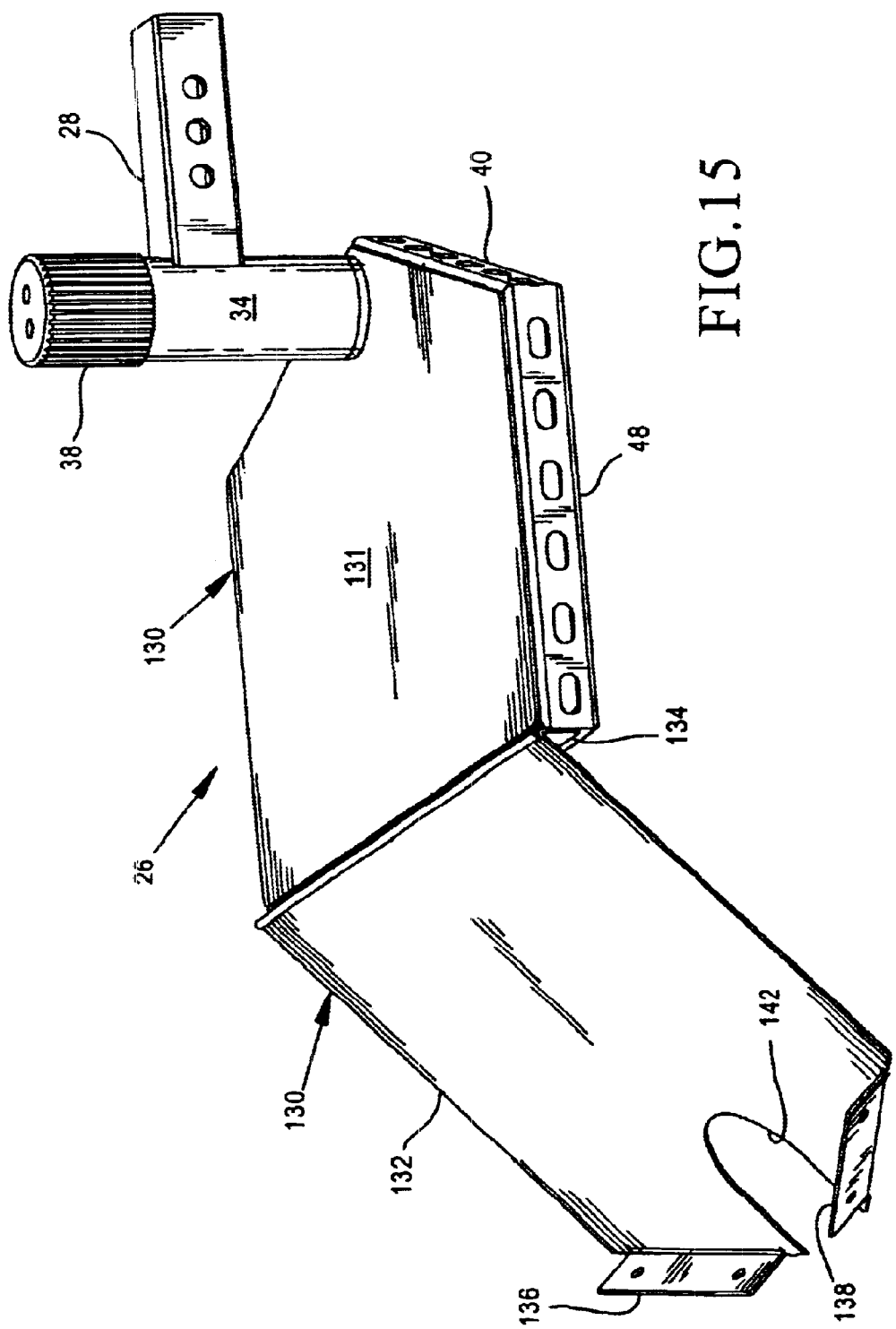
FIG. 15 is a perspective view of the FIGS. 1 and 2 step: this figure shows in detail a protective platform cover omitted in FIGS. 12–14 in the interest of clarity.
Figure 16:
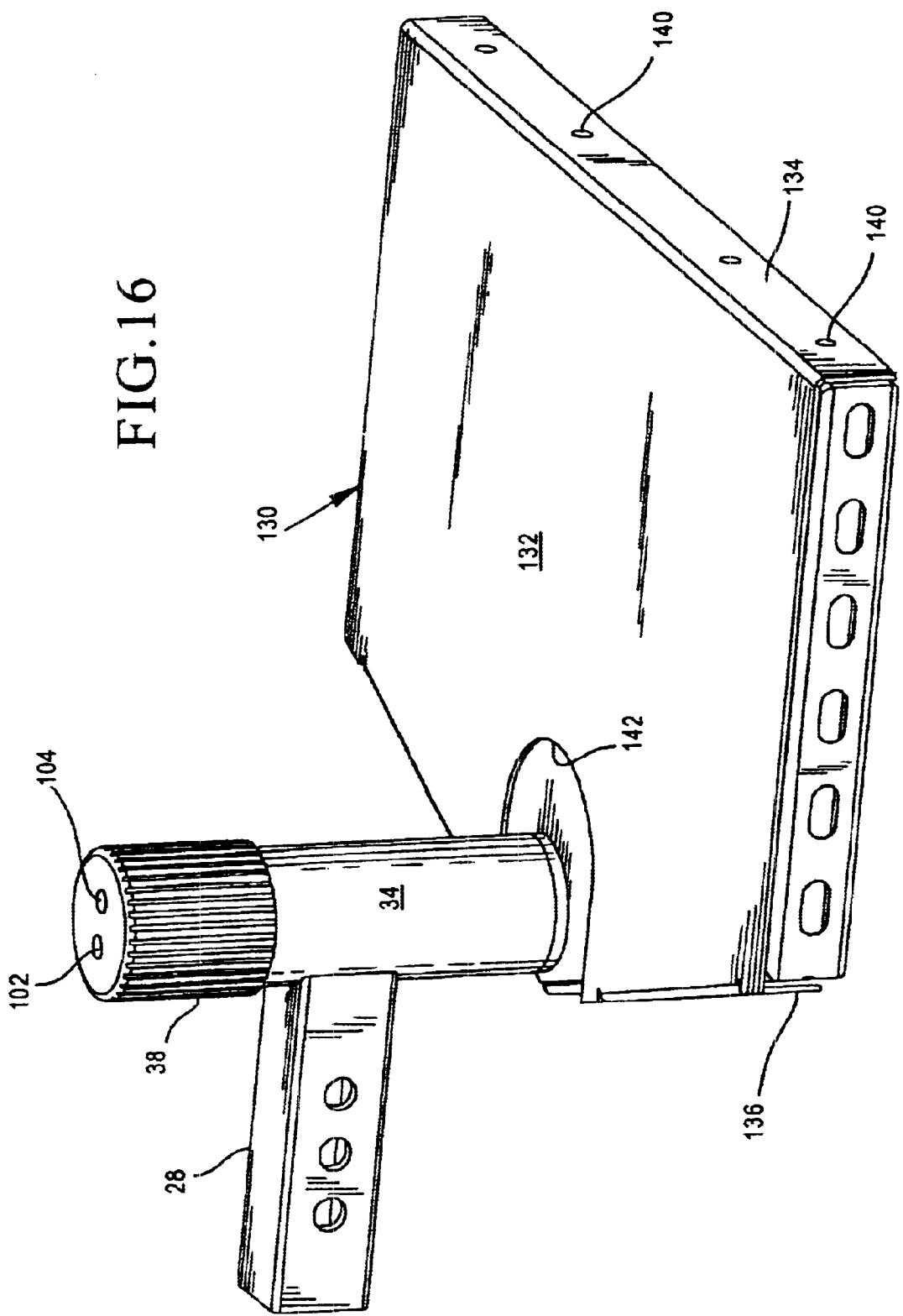
FIGS. 16 and 17 are perspective views of the step with the platform cover snapped in place.
Figure 17:
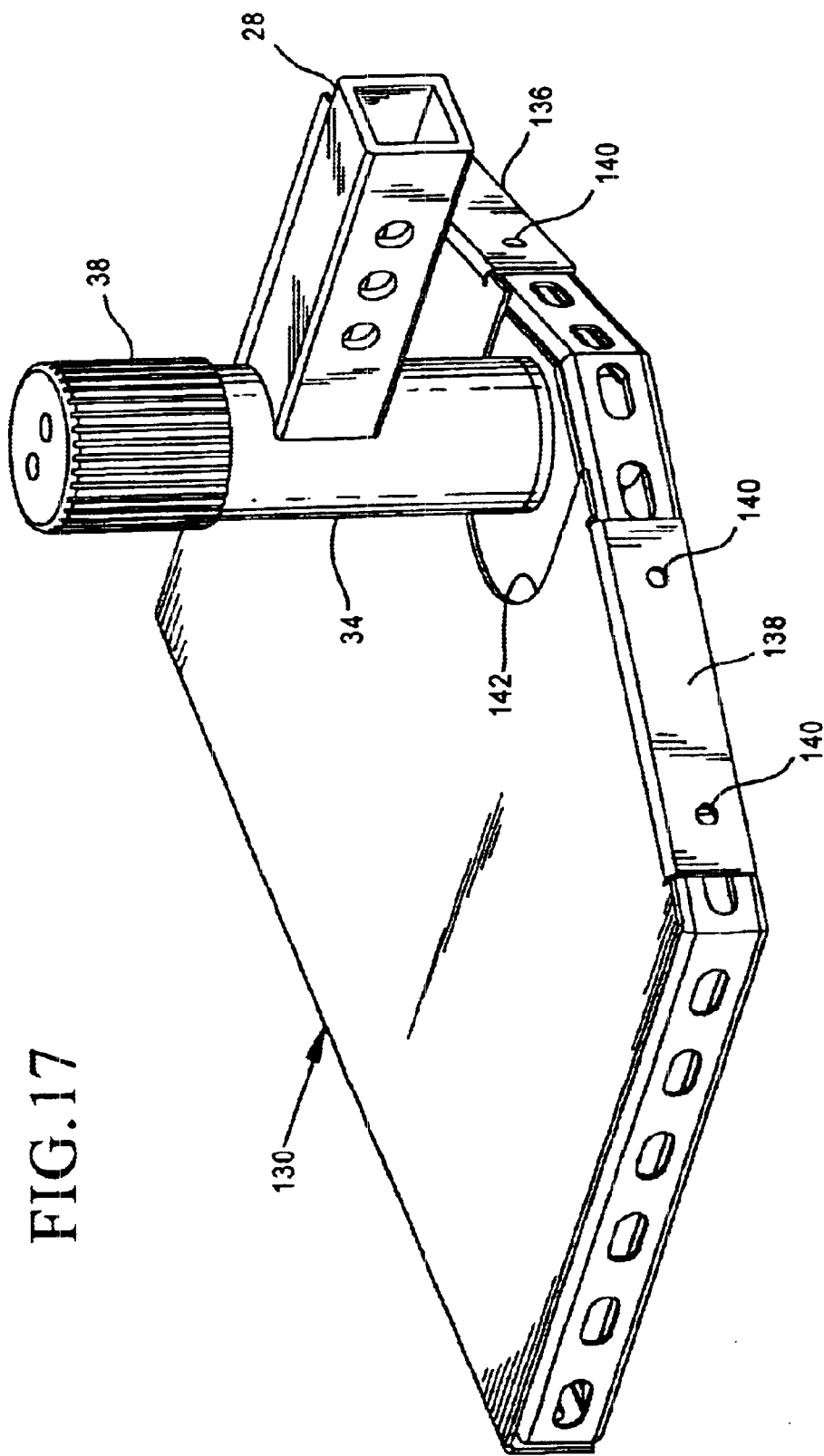

Referring now to FIGS. 15–17, an optional but preferable component of the step 24 is a platform cover 130 which keeps the upper surface of platform deck 52 from becoming dirty as it is otherwise apt to do with platform 26 in its stowed position under vehicle 20, especially if the vehicle is traveling over wet and muddy surfaces. Cover 130 has an upper panel 132, a depending front panel 134, and depending rear panels 136 and 138. The depending panels 134, 136, and 138 are detachably secured to the front and rear girders or structural members 38, 40, and 42 of platform 26 as by the illustrated snaps, all identified in the drawings by reference character 140. To expose the deck of platform 26, the rear panels 136 and 138 of cover 130 can be unsnapped, and cover 130 simply allowed to hang down as shown in FIG. 15. Alternatively, front panel 134 can also be unsnapped and cover 130 completely removed from the deck 52 of step 24.

The details of cover 130 are not critical as far as the present invention is concerned. Of those details, the only ones deemed noteworthy are the cutout 142 (FIGS. 16 and 17) which accommodates the outer column 34 of step 24 and the typical manufacture of the cover from a nonskid material which offers optimal use of the step with the cover in place.

While the invention is described and illustrated herein in the context of a preferred embodiment, it is to be understood that the invention may be embodied in many forms without departing from the spirit or the essential characteristics of the invention. The present embodiment is therefore to be considered in all respects as illustrative and not restrictive. The scope of the invention is indicated by the appended claims rather than by the foregoing descriptions and illustrations, and all changes which come within the meaning and range of equivalency of the claims are intended to be embraced therein.

What is claimed is:

1. A device which comprises a platform with a horizontally orientable surface;

a mechanism for displacing said platform between operative and stowed positions, said mechanism comprising:
 a) components, including an outer column;
 b) an inner column rotatably supported in the outer column for rotating the platform about a vertical axis of rotation from each to the other of said positions;
 c) a latching mechanism having complementary components for releasably locking the platform in its operative position and in its stowed position; and
 d) a device mounting component mounted to the outer column and configured to fit in a trailer hitch receiver, said platform being restrained to remain at the same vertical level in its stowed and deployed positions and as it is maneuvered between those positions.

2. A device which comprises:

a platform with a horizontally orientable surface; and a mechanism for displacing said platform between operative and stowed positions, said mechanism comprising:
 (a) components for rotating the platform about a vertical axis of rotation from each to the other of said position, including a vertically oriented, non-rotatable and vertically fixed outer column;
 (b) a complementary inner column installed for rotation about said vertical axis in the outer column, said platform being fixed to said inner column for rotation therewith from each to the other of said positions;
 (c) a latching mechanism having complementary components including a latching element which is disposed in the inner column aperture;

(d) a cam component housed in the inner column and having a first position in which the latching element is so displaced by the cam component into the aperture and the outer column to lock the inner and outer columns together to preclude rotation of the inner column and consequently keep the platform of the device in one of those positions to which the platform has been displaced, said platform being restrained to remain at the same vertical level as the stowed and deployed positions and as it is maneuvered between those positions.

3. A device as defined in claim 2 which has a component that biases the cam component to the first position of said component.

4. A device as defined in claim 3 in which the biasing component is a compression spring.

5. A device as defined in claim 4 which:

has a stop which spans the interior of the inner column and is fixed to said column;

said cam component having a depending boss; and said compression spring: (a) encircling said boss, and (b) being trapped between the cam component and the stop in the inner column.

6. A device as defined in claim 2 which has an actuator component which is manually actuatable to displace the cam component to a second position in which the latching element can move out of the aperture in the outer column, freeing said inner column for rotation in the outer column and consequently allowing the platform to be rotatably displaced from one to the other of the operative and stowed positions of the platform.

7. A device as defined in claim 6 in which the actuator component is fixed to an upper end of the cam component and is slidably supported by the outer column of the device.

8. A device as defined in claim 2 which has at least two complements of latching element, inner column recess, and outer column recess, said complements being equidistantly spaced about said vertical axis of rotation.

9. A device as defined in claim 2 in which the cam component is housed, and vertically displaceable, in the inner column of the device.

10. A device as defined in claim 9 which:

comprises a guide element for the cam component;

there being a vertically elongated slot in the cam component; and said guide element: (a) extending through said slot, and (b) being fixed to the inner column of the device.

11. A device as defined in claim 2 which:

has vertically spaced apart guide elements;

said guide elements so surrounding the cam component and contacting the inner column of the device as to guide said cam component as it is displaced relative to the inner column of the device.

12. A device as defined in claim 11 which has an arrangement for limiting the displacement of the cam.

13. The combination of:

a vehicle;

a trailer hitch receiver mounted to said vehicle;

a device mounted to the vehicle by said trailer hitch receiver wherein the device comprises a platform with a horizontally orientable surface; and a mechanism for displacing said platform between operative and stowed positions, said mechanism comprising: (a) components for rotating the platform about a vertical axis of rotation from each to the other of said positions; (b) a latching mechanism having complementary components for releasably locking the platform in its operative position and in it stowed position, said platform being restrained to remain at the same vertical level in its stowed and deployed positions and as it is maneuvered between those positions.

14. A combination device as defined in claim 13 wherein said device comprises an inner column and an outer column;

the platform being fixed to the inner column for rotation therewith; and the device further comprising a component fixed to the outer column which is configured for installation in said trailer hitch receiver.

* * * * *